United States Patent [19]

Sharaby

[11] Patent Number: 4,871,780

[45] Date of Patent: Oct. 3, 1989

[54] POROUS COPOLYMER RESINS

[75] Inventor: Zaev Sharaby, Cleveland Heights, Ohio

[73] Assignee: The B.F. Goodrich Company, Akron, Ohio

[21] Appl. No.: 200,496

[22] Filed: May 31, 1988

[51] Int. Cl.$^4$ ................................................ C08J 9/02
[52] U.S. Cl. ........................................ 521/56; 521/60; 521/145; 526/266; 526/319; 526/320
[58] Field of Search ......................... 521/56, 60, 145; 526/266, 319, 320

[56] References Cited

U.S. PATENT DOCUMENTS

| 3,945,958 | 3/1976 | Koyanagi et al. | 526/200 |
| 3,951,925 | 4/1976 | Mishima et al. | 526/73 |
| 4,504,635 | 3/1985 | Weber et al. | 525/450 |
| 4,680,361 | 7/1987 | Koleske et al. | 526/318 |
| 4,695,616 | 9/1987 | Caporossi et al. | 526/202 |

Primary Examiner—Morton Foelak
Attorney, Agent, or Firm—Thoburn T. Dunlap

[57] ABSTRACT

Vinyl halide copolymer resins having relatively high porosity levels are produced by polymerizing a vinyl halide with a comonomer of an acrylated caprolactone. The product produced exhibits high absorbtivity of plasticizer, easy processability and films made therefrom have low fish-eye content.

19 Claims, 5 Drawing Sheets

POROUS COPOLYMER RESINS

BACKGROUND OF THE INVENTION

1. Technical Field

This invention relates to vinyl halide copolymer compositions having good porosity properties. More specifically, this invention relates to copolymers of vinyl chloride and acrylated caprolactones which exhibit high porosity levels, high absorbtivity of plasticizer, easy processability and excellent moldability.

2. State of the Art

It is well-known that polyvinyl chloride (PVC) is one of the most useful materials known because of its superior chemical, physical and mechanical properties. It is also well established that PVC is one of the most modifiable plastic materials in existence. Consequently, PVC is used in large volumes because it can be modified to desired specifications to make specific molded end products. In choosing the method and materials for modifying PVC for particular molding applications, it is important that the chemical, physical and mechanical properties inherent in PVC be retained.

In one technique to improve upon the physical and mechanical properties of PVC, vinyl chloride monomer is copolymerized with various comonomers to achieve certain desired properties, such as improved processability. For example, it is well-known that the copolymerization of vinyl acetate with vinyl chloride results in a copolymer with improved processability over homopolymers of vinyl chloride. While this approach is advantageous in many applications, one of the problems encountered is that certain of the desirable properties inherent in the vinyl chloride homopolymer may be lost at the expense of the copolymerization. For example, in suspension polymerization, the PVC homopolymer particles produced are generally porous. Porosity is a very important property of the resin particles because it not only allows the polymerized resin particles to be easily stripped of its residual monomer thereby making it easier to comply with worker safety standards, but also gives the resin the ability to absorb large quantities of plasticizers. However, unlike PVC homopolymer, copolymers of vinyl chloride and vinyl acetate are "glassy" (e.g., lack porosity). Vinyl chloride copolymers made with 3 to 6 weight percent of vinyl stearate or other vinyl ester comonomers have been found to have very low porosity levels (below 0.10 ml/g as measured by mercury intrusion). In addition, unfavorable phenomenon such as the fusion of primary resin particles occurs during the polymerization reaction. Scanning electron microscopy (SEM) has revealed that a complete fusion of primary resin particles occurs during the copolymerization of vinyl chloride and vinyl acetate at conversion levels of 5 to 8 percent. Low resin porosities coupled with the fusion of primary resin particles leads to low level plasticized resins of irregular shape.

U.S. Pat. Nos. 3,945,958; 3,951,925 and 4,695,616 all disclose attempts to produce vinyl chloride polymers and copolymers having improved porosity. However, the methods disclosed therein require extremely specific suspending agents, catalysts and additives, as well as strict control over process conditions. No attempt is made to improve resin porosity through comonomer systems.

It would be highly desirable to provide a vinyl chloride copolymer resin with improved porosity and morphology properties that is easily polymerized using conventional polymerization additives and techniques. It would also be desirable to have a copolymer resin that is amenable to processing in the formation of molded articles.

SUMMARY OF THE INVENTION

Accordingly, it is an object of this invention to provide a porous vinyl halide copolymer resin that is superior in the absorptivity of plasticizers.

It is a further object of this invention to provide a vinyl halide copolymer resin that is easily processable and moldable into desired end products.

It is still a further object of this invention to provide a copolymer resin that will not agglomerate or fuse together during polymerization.

Yet a further object of this invention is to provide a molded (e.g., by extrusion or injection molding) article having excellent physical properties.

Another object of this invention is to provide a method for preparing a porous vinyl halide copolymer resin of varying molecular weights.

These and other objects are accomplished herein by a vinyl halide copolymer resin comprising repeating units of vinyl halide and acrylated caprolactone, wherein the vinyl halide is present in the amount of about 80 to 99 percent by weight and the acrylated caprolactone is present in the amount of about 20 to 1 percent by weight of the total comonomer.

BRIEF DESCRIPTION OF THE DRAWINGS

FIGS. 1a through 1e are light reflectance photographs at 44× magnification of PVC, vinyl chloride/vinyl acetate and vinyl chloride/acrylated caprolactone resins.

FIG. 1c is a photograph of vinyl chloride/acrylated caprolactone copolymer resin containing 10.9 wt. % TONE M-100 acrylated caprolactone.

FIG. 1d is a photograph of vinyl chloride/vinyl acetate resin containing 2.2 wt. % vinyl acetate.

FIGS. 2a through 2d are scanning electron micrographs (SEM) of vinyl chloride/acrylated caprolactone, vinyl chloride/vinyl acetate and vinyl chloride/ethylhexyl acrylate resins.

DETAILED DESCRIPTION

Figure 1A:
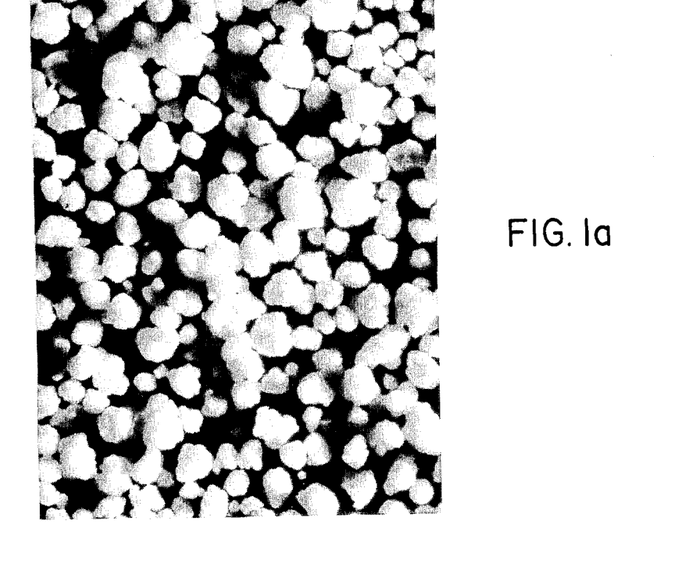
FIG. 1a is a photograph of PVC homopolymer resin.
Figure 1B:
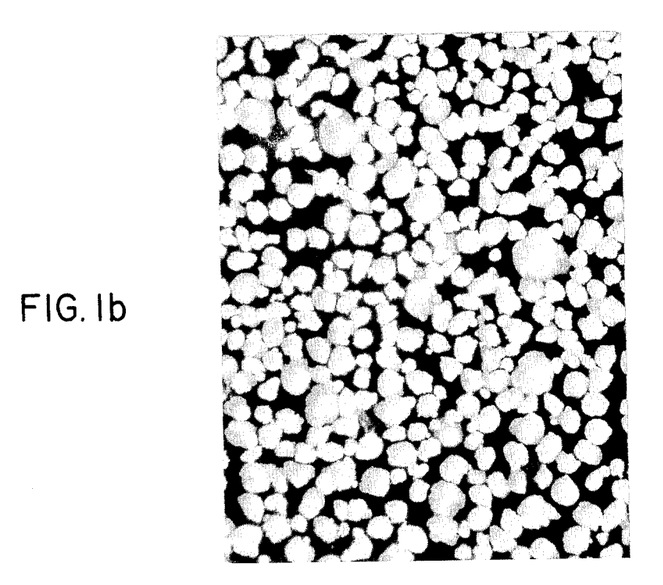
FIG. 1b is a photograph of vinyl chloride/acrylated caprolactone copolymer resin containing 2.2 wt. % TONE M-100 acrylated caprolactone.
Figure 1E:
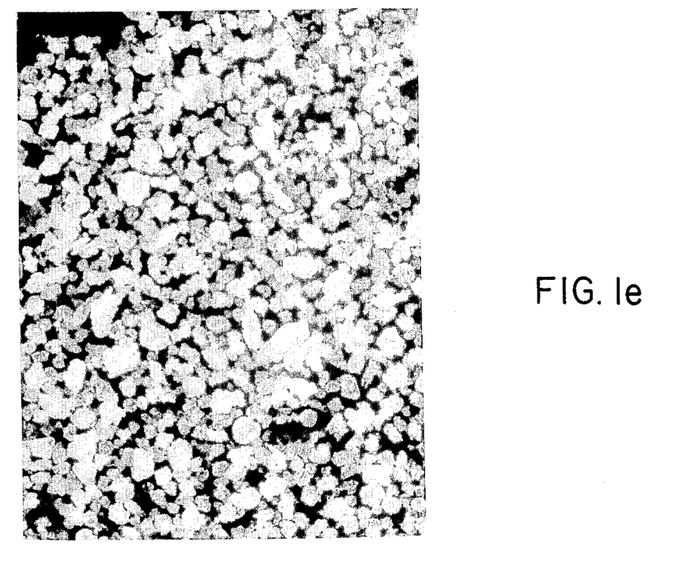
FIG. 1e is a photograph of vinyl chloride/vinyl acetate resin containing 5.4 wt. % vinyl acetate.
Figure 2A:
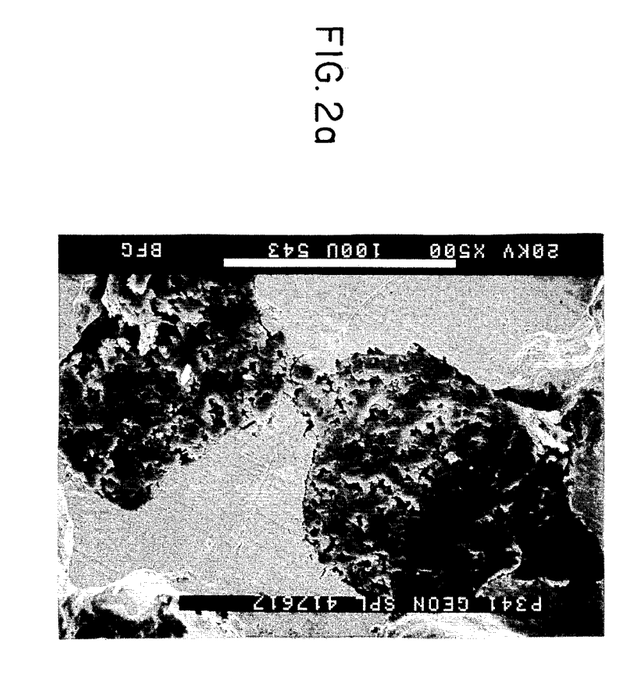
FIG. 2a SEM at 500× showing a cross-sectional view of a vinyl chloride/acrylated caprolactone copolymer resin particle (3.1 wt. % TONE M-100 acrylated caprolactone content).
Figure 2B:
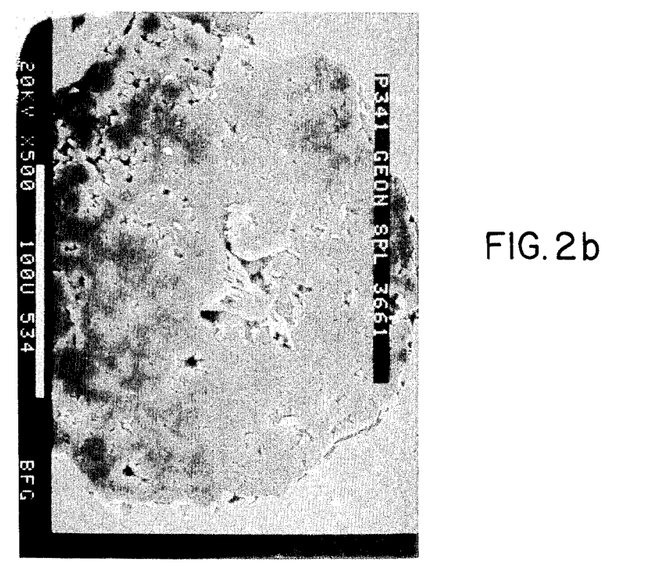
FIG. 2b SEM at 500× showing a cross-sectional view of a vinyl chloride/acrylated caprolactone copolymer resin particle (10.9 wt. % TONE M-100 acrylated caprolactone content).
Figure 2C:
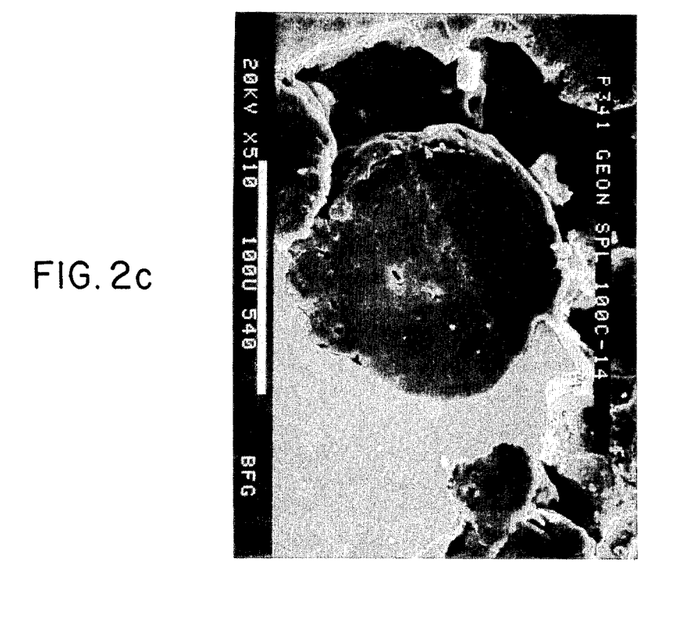
FIG. 2c SEM at 510× showing a cross-sectional view of a vinyl chloride/vinyl acetate copolymer resin particle (2.2 wt. % vinyl acetate).
Figure 2D:
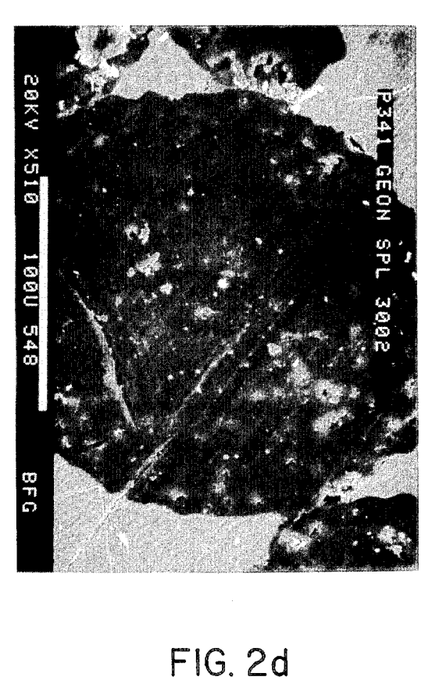
FIG. 2d SEM at 510× showing a cross-sectional view of a vinyl chloride/ethyl hexyl acrylate copolymer resin (2.0 wt. % Ethyl hexyl acrylate).

The novel vinyl halide copolymers of the present invention have advantages over other vinyl halide copolymer compositions of the prior art in that they are easy to process and mold into final end products. More specifically, the copolymerization of acrylated caprolactone with vinyl chloride produces copolymer particles with unique morphology characteristics never before observed with vinyl acetate or vinyl ester copolymer resins. In particular, the vinyl chloride/acrylated caprolactone copolymers of this invention have superior porosity characteristics when compared to vinyl chloride/vinyl acetate and vinyl chloride/vinyl sterate copolymers made under similar conditions. The copolymerization of acrylated caprolactone with vinyl chloride maintains and or may improve resin porosity levels over that of PVC homopolymer (compare, for example, FIGS. 1a, 1b and 1c). The light reflectance photomicrographs of vinyl halide/acrylated caprolactone copolymers shown in FIGS. 1b and 1c are similar to the light reflectance photomicrographs of PVC homopolyer shown in FIG. 1a. The reflected light is a function of the porosity of the resin sample. Glassy or non-porous resins appear relatively dark and crystalline as shown in FIGS. 1d and 1e.

The copolymers of the present invention comprise repeating units of vinyl halide and acrylated caprolactone. The final copolymer resin contains from about 80 percent to 99 percent by weight of vinyl chloride and from about 20 percent to about 1 percent by weight of an acrylated caprolactone. As used herein the term vinyl halide includes vinyl chloride and vinylidene halides such as for example, vinylidene chloride. As used herein, the acrylated caprolactone repeating unit of the present copolymer may be represented by the following average formula:

wherein R is hydrogen, lower alkyl, or phenyl, $R_1$ and $R_2$ are, independently, alkylene of 1 to about 8 carbon atoms and n is 1 to about 20. Lower alkyl as used herein refers to branched or straight chain alkyl groups of 1 to 6 carbon atoms. It should be evident to those skilled in the art that n, as used herein, represents an average of the caprolactone molecules per acrylate group. It is also contemplated that fractional values of n between 1 and 20 are within the scope of this invention.

The preferred acrylated caprolactone monomers utilized in the present invention may be prepared by the reaction of the appropriate acryloyl alcohols, e.g., hydroxyalkyl acrylates or hydroxyalkyl alkylacrylates with epsilon-caprolactones. Methods for preparing acrylated caprolactones are disclosed in copending U.S. patent application Ser. No. 046,818, filed on May 7, 1987 pk which is hereby incorporated by reference. Other methods for preparing acrylated caprolactones are disclosed in U.S. Pat. No. 4,504,635. The preferred acrylated caprolactone comonomers are those derived from 2-hydroxyethyl acrylate, which may be represented by the following average formula:

wherein n is 1 to 20.

The preferred acrylated caprolactones and non-acrylated caprolactone precursors are commercially available from various manufacturers. For example, acrylated and non-acrylated caprolactones are manufactured and sold by Union Cabide Corp. under the TONE ® trademark. Representative formulas are set forth below.

| ACRYLATED AND NON-ACRYLATED CAPROLACTONES | | |
|---|---|---|
| TONE ® Monomer Designation | Approximate No. of Repeating Units (n) | Approximate Molecular Wt. |
| XM-100 | 1 | 230 |
| M-100 | 2 | 340 |
| 0200* | 4–6 | 500 |
| 0240* | 16–18 | 2000 |

*Acrylated caprolactone monomer was prepared in-house by reacting the appropriate TONE caprolactone diol with acryloyl chloride.

The porous copolymeric compositions of the present invention can be prepared by conventional polymerization in which vinyl halide monomers are copolymerized with acrylated caprolactone comonomers, polymerization catalysts, and if desired, chain transfer agents. The comonomers may be polymerized by any one of a variety of polymerization techniques including mass polymerization, suspension polymerization, or microsuspension polymerization via the polymerization reaction of the ethylenically unsaturated groups of the respective monomers. Although the copolymers of this invention can be polymerized via emulsion polymerization, a porous resin is not obtained due to the small particle size of emulsion resins. The preferred process, however, for preparing the copolymers according to this invention is the suspension polymerization process. Suspension polymerization techniques are well-known in the art as set forth in the *Encyclopedia of PVC*, pp. 76–85, published by Marcel Decker, Inc. (1976) and need not be discussed in great detail here. Generally, the copolymers are suspension-polymerized in an aqueous medium containing: (1) a suspending agent consisting of one or more water-soluble polymer substances such as polyvinyl alcohol, cellulose ether, partially hydrolyzed polyvinyl acetate, vinyl acetate-maleic anhydride or partially saponified polyalkyl acrylate or gelatine, and (2) a polymerization initiator. Suitable polymerization initiators are selected from the conventional free radical initiators such as organic peroxides and azo compounds. The particular free radical initiator will depend upon the monomeric materials being copolymerized, the molecular weight and color requirements of the copolymer and the temperature of the polymerization reaction. Insofar as the amount of initiator employed is concerned, it has been found that an amount in the range of about 0.005 part by weight to about 1.00 part by weight, based on 100 parts by weight of vinyl halide comonomer being polymerized, is satisfactory. It is preferred to employ an amount of initiator in the range of about 0.01 part by weight to about 0.20 part by weight, baed on 100 parts by weight of vinyl halide monomer. Examples of suitable initiators include lauroyl peroxide, benzoyl peroxide, acetyl cyclohexyl sulfonyl peroxide, diacetyl peroxide, cumeme hydroperoxides, 5-butyl peroxyneodecanoate, alpha-cumyl peroxyneodecanoate, t-butyl cumyl peroxyneodecanoate, t-butyl peroxypivalate, t-butyl peroxyactoate, isopropyldicarbonate, di-n-propyl peroxydicarbonate, disecondary butyl peroxydicarbonate, 2,2'-azobis-(2,4,-dimethyl valeronitrile), azobisisobutylnitrile, azo-diisobutynate and t-butyl perbenzoate, the choice depending on the reaction temperature.

The suspension polymerization process of this invention may be carried out at any temperature which is normal for the copolymer to be polymerized. A temperature range from about 0° C. to about 80° C. is employed. Preferably, a temperature range from about 40° C. to about 70° C. may be employed with a range from about 50° C. to about 60° C. being the most preferable. So far as the temperature is within these ranges, they may be varied in the course of the polymerization. In order to facilitate temperature control during the polymerization process, the reaction medium is kept in contact with cooling surfaces cooled by water, brine, evaporation, etc. This is accomplished by employing a jacketed polymerization reactor wherein the cooling medium is circulated through the jacket throughout the polymerization reaction. This cooling is necessary since most all of the polymerization reactions are exothermic in nature. It is understood of course, that a heating medium may be circulated through the jacket, if necessary.

The fact that lower molecular weight copolymers may optionally be efficiently and effectively produced is one of the preferred advantages of the present invention. By low molecular weight what is meant is that the inherent viscosities of the copolymers of the present invention range from about 0.1 to about 0.7. The inherent viscosity is a representative measure of the molecular weight of a polymer and is obtained in accordance with ASTM procedure No. D-1243-66. It is recognized that the processability of vinyl halide polymers and particularly a vinyl chloride polymer depends to a large extent upon its average degree of polymerization. Polymers having relatively low molecular weights or low inherent viscosities are generally the easiest to fabricate because of their low melt viscosities, low shear sensitivity, good heat stability under high shear, and excellent flow characteristics. Because of these desirable processing characteristics, low molecular weight vinyl chloride polymers are widely used in applications in which they are injection molded or extruded to form products that may have thin walls, large surface areas, and deep-draw and/or intricate surface detailed parts. They are also used as processing aids in high molecular weight vinyl chloride homopolymers and copolymers.

Specifically, the preferred suspension process of this invention utilizes a chain transfer agent (CTA) to produce the low molecular weight copolymers of this invention. Suitable chain transfer agents applicable for this purpose are, for example, saturated hydrocarbons, such as n-pentane and n-hexane, saturated or unsaturated chlorinated hydrocarbons, such as carbon tetrachloride, trichloroethylene and perchloroethylene, aldehydes, such as propionaldehyde and n-butylraldehyde and certain mercapto-containing organic compounds. The most preferred CTA, however, comprises a composition of: (a) at least one mercaptan chain transfer agent and optionally (b) at least one non-polymerizable material which is miscible with the mercaptan chain transfer agent. Suitable mercaptans for the practice of this invention include water soluble mercaptans such as 2-mercaptoethanol, 3-mercaptopropanol, thiopropyleneglycol, thioglycertine, thioglycolic acid, thiohydracylic acid, thiolactic acid and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, bis-(2-mercaptoethyl) ether, alkyl mercaptans, and the like. The most preferred mercaptan for use in the present invention is 2-mercaptoethanol (2-ME), however, any chain transfer agent having one or more mercapto (—SH) group(s) would be acceptable.

The chain transfer composition may be pre-mixed with the comonomer to encapsulate the mercaptan chain transfer agent before its introduction into the reactor. Alternatively, the chain transfer agent may be pre-mixed with a non-polymerizable material which is miscible with the chain transfer agent and is substantially insoluble in water. The term non-polymerizable as used herein means that the material does not form a part of the vinyl polymer backbone in the sense that a traditional comonomer would form. The non-polymerizable material may, in some cases, graft polymerize onto the vinyl polymer chain but this is not normally considered a copolymer. The term substantially insoluble in water as used in this specification means that the materials have less than 5% solubility in water. The non-polymerizable material may be a monomer, oligomer or a polymer. Suitable non-polymerizable materials include dioctyl phthalate, low molecular weight poly (caprolactone), polysilicones, esters of glycerols, polyesters, water insoluble esters of fatty acids with -OH terminated polyoxyethylene and polyoxypropylene, esters of polyols, esters of monoacids and polyacids, esters of organic polyphosphates, phenyl ethers, ethoxylated akylphenols, sorbitan monostearate and sorbitan monooleate and other sorbitol esters of fatty acids. Usually, the chain transfer composition must contain at least an equal amount in weight of non-polymerizable material as chain transfer agent in order to encapsulate or host the chain transfer agent. Preferably, the composition contains at least twice as much weight of non-polymerizable material as chain transfer agent.

The amounts of chain transfer agent employed in the practice of both the comonomer and non-polymerizable material encapsulant embodiments of the present invention range from 0.05 to 2.0 phm by weight per 100 phm of vinyl halide comonomer. Preferably from 0.1 to 1.0 phm by weight per 100 phm of vinyl halide comonomer may be employed. Most preferably 0.1 to 0.8 phm by weight per 100 phm of vinyl halide comonomer may be utilized. The chain transfer agent may be added to the reaction medium before the onset of polymerization or it may be metered in during the course of the polymerization reaction in combination with the comonomer or non-polymerizable material.

The terms "encapsulation", "encapsulate" and "encapsulating" as used herein mean that the CTA is homogeneously mixed with the comonomer or non-polymerizable material.

The preferred polymerization initiators utilized in the process for preparing the low molecular weight copolymers of the present invention are alpha-cumyl peroxyneodecanoate, t-cumyl peroxyneodecanoate, t-butyl peroxypivalate and t-amyl peroxyneodecanoate or combinations thereof. Most preferably, a dual initiator composition comprising alpha-cumyl peroxyneodecanoate and t-butyl peroxypivalate is utilized as the initiator. This initiator system results in a reduced residual initiator level in the final product and a shorter high temperature history due to faster reactions.

The concentration of acrylated coprolactone comonomer in the polymerization medium can range from about 1 to about 20 phm by weight based upon 100 phm by weight of vinyl chloride monomer. The polymerized copolymer contains from about 1 to about 20 percent by weight of acrylated caprolactone. Preferably the polymerized copolymer contains from about 3 to about 10 weight percent of acrylated caprolactone. In order to obtain a heterogenous copolymer (e.g. to randomize the distribution of acrylated comonomer units along the copolymer backbone), it is preferable to meter the acrylated caprolactone comonomer into the reaction medium during the course of the polymerization. Of course, if a low molecular weight copolymer is desired, the appropriate CTA is utilized in the reaction medium as previously set forth.

It has been found in accordance with the present invention that the porosity level of the copolymer decreases as the caprolactone comonomer content goes beyond 10 weight percent of the copolymer. Additionally, the fusion of primary resin particles occurs and begins to increase as comonomer levels reach beyond 10 weight percent of the comonomer. As indicated above the preferred polymerization temperature is about 50° C. to about 60° C. It has also been found that copolymers prepared at higher temperatures have less porosity due to the increased fusion of primary particles.

The copolymeric resins obtained from the process of the present invention may also contain pigments, fillers, stabilizers and plasticizers and the like which are conventionally present in PVC molding compositions in conventional quantities. In preparing molding compositions the ingredients are mixed by conventional procedures used in the production of molded products. For example, the desired resin composition containing the copolymer resins of the present invention is homogeneously kneaded by a mill roll, a Banbury mixer, an extruder or the like, and thereafter is fed in the molded step of calendering, extrusion, injection or pressing. In calendering the composition is continuously fed to a calender and calendered into a film or sheet. In the case of extrusion molding, injection molding or press molding, the kneaded composition may be molded after it is pelletized. The molding conditions herein are the same as the conventional processing conditions for PVC and any specific conditions are not required.

A described hereinabove, the vinyl chloride/acrylated caprolactone copolymers of the present invention are excellent from the point that an easily plasticized vinyl chloride copolymer is obtained having excellent physical properties and amenable to processing to form molded products.

Various vinyl chloride copolymer resins and compositions within the scope of the present invention are illustrated in the following examples. While these examples will show one skilled in the art how to operate within the scope of this invention, they are not to serve as a limitation on the scope of the invention for such scope is defined only in the claims. It is pointed out that in the following examples, and elsewhere in the present specification and claims, all percentages and all parts are intended to express percent by weight and parts by weight unless otherwise clearly indicated.

EXAMPLES 1-7

100 phm of VCM, 150 phm of deionized (D.I.) water, 0.08 to 0.15 phm of hydroxypropyl methylcellulose suspending agent, 0.8 to 0.15 phm of polyvinyl alcohol (PVA), 25-50% hydrolyzed and the amounts of various comonomers, chain transfer agent (CTA) and alpha-cumyl peroxy neo-deconoate/t-butyl peroxypivalate (CPND/TBPP) polymerization initiator given in Table I were introduced into a 3L capacity reactor equipped with an agitator. The CTA was pre-mixed with the comonomer prior to charging into the reactor. The ingredients were charged into the reactor in the following combinations and order; (1) D.I. H$_2$O/initiators/methylcellulose, (2) comonomer/CTA, (3) VCM/PVA. The suspension polymerization was conducted at a temperature of 70° C. under agitation at 550 rpm until the reaction was complete. The copolymer resins were then recovered, stripped, washed, dried, and characterized for inherent viscosity (I.V.), average particle size (APS), particle size distribution (PSD) and Mercury intrusion porosity. I.V. was measured per ASTM procedure D-1243, APS and PSD were determined by standard screen analysis and Hg porosity per ASTM D-2873. The results are set forth in Table I.

TABLE I

| Example No. | Comonomer Type | Comonomer Level (phm) | CTA 2-Me (phm) | TBPP/CPND (phm) | Conv. (Wt. %) | I.V. (m) | APS (%) | PSD (%) | Hg Porosity (ml/g) |
|---|---|---|---|---|---|---|---|---|---|
| 1 | VAc | 2.5 | 0.5 | 0.07/0.06 | 65 | 0.375 | 85 | 97 | 0.038 |
| 2 | VAc | 7.5 | 1.0 | 0.12(a)/0.10 | 75 | 0.438 | 117 | 77 | 0.076 |
| 3 | VAc | 10 | 0.1 | 0.065/0.05 | 72 | 0.469 | 95 | 37 | 0.021 |
| 4 | TONE M-100 | 2.5 | 0.2 | 0.075/0.06 | 76 | 0.413 | 92 | 42 | 0.128 |
| 5 | TONE M-100 | 5.0 | 0.2 | 0.07/0.06 | 66 | 0.455 | 85 | 39 | 0.101 |
| 6 | TONE M-100 | 7.5 | 0.2 | 0.06/0.05 | 49 | 0.426 | 189 | 32 | 0.368 |
| 7 | TONE XM101 | 5.0 | 0.20 | 0.075/0.055 | 75 | 0.505 | 138 | 68 | 0.208 |

(a) Made at 60° C. TBPP was replaced with t-amyl peroxyneodecanoate  VAc = vinyl acetate

EXAMPLES 8-12

The copolymerization of vinyl chloride with acrylated caprolactones produces copolymers with a high degree of porosity relative to copolymers of other vinyl esters. The copolymer thusly produced could be plasticized to a high degree as is common with PVC homopolymer.

100 phm of VCM, 150 phm of D.I. water, 0.035 phm high hydrolysis PVA (85% hydrolyzed), 0.06 phm PVA (45-55% hydrolyzed), 0.045 phm of hydroxypropyl methylcellulose suspending agent, 0.045 phm of EHP polymerization initiator and the amounts of TONE M-100 comonomer given in Table II were introduced into a 55L reactor equipped with an agitator. The comonomer was metered into the reactor between 0 to 55% polymer conversion. The suspension polymerization was conducted at 56° C. under agitation at 500 rpm until complete. The copolymer resins were recovered from the reactor and stripped, dried, and characterized for I.V., APS, PSD and as Hg porosity set forth in Examples 1–7. The results are given in Table II.

EXAMPLES 13–18

100 phm of VCM, 150 phm D.I. water, 0.10 phm of a methylcellulose suspending agent, 0.08 phm PVA (25% hydrolyzed), 0.012 to 0.020 phm/0.03 to 0.036 phm of TBPP/CPND polymerization initiator and the amounts of TONE M-100 comonomer given in Table II were introduced into a 55L reactor equipped with an agitator. The PVA was pre-mixed with the VCM and the comonomer was metered into the reactor during the polymerization. The suspension polymerization was conducted at 70° C. under agitation at 300 rpm. Upon completion of the polymerization, the copolymer resins were recovered from the reactor and stripped, dried, and characterized as in Examples 8–12 above. Results are set forth in Table II.

The reaction conditions, comonomers and properties of the resultant copolymers are set forth in Table III.

TABLE III

| Example No. | Comonomer Type | Level (phm) | 2-ME (phm) | Reaction Temp/Time (°C./Min.) | Conv. (wt %) | I.V. | APS (um) | PSD (%) | Hg Porosity (ml/g) |
|---|---|---|---|---|---|---|---|---|---|
| 19 | TONE XM-101 | 2.5 | 0.20 | 70/290 | 66 | 0.347 | 101 | 63 | 0.167 |
| 20 | TONE XM-101 | 9.0 | — | 70/310 | 67 | P.S. | 82 | 53 | 0.146 |
| 21 | TONE XM-101 | 15.0 | 0.40 | 70/193 | 68 | P.S. | 208 | 61 | 0.199 |
| 22 | TONE M-0240 | 3.7 | — | 82/236 | 72 | 0.479 | 87 | 41 | 0.100 |
| 23 | TONE M-0200 | 3.7 | — | 70/330 | 83 | P.S. | 115 | 28 | 0.172 |

P.S. = partially soluble

EXAMPLES 24–26

Vinyl chloride/acrylated caprolactone (TONE M-100) copolymer resins were prepared as set forth in Examples 8–12. The copolymer resins were compounded in accordance with the following recipe (parts are given by weight): 100 parts copolymer resin, 60 parts DOP plasticizer, 5 parts epoxidized linseed oil plasticizer, 3 parts calcium-zinc stabilizer and 0.3 parts stearic acid stabilizer. The resins and compound ingredients were processed on a two roll mill at 320° F. for 2 minutes. The mechanical properties of the compounded resins are summarized in Table IV.

TABLE IV

| Properties | PVC | Example 24 | Example 25 | Example 36 |
|---|---|---|---|---|
| Comonomer content (wt. %) | 0 | 2.95 | 6.35 | 10.88 |
| Tensile Strength (psi) (ASTM D-412) | 2083 | 1994 | 1859 | 1640 |
| Modulus at 100% (psi) | 975 | 908 | 837 | 673 |
| Max. Elongation (%) | 398 | 382 | 341 | 334 |
| Young Modulus (psi) | 1302 | 1173 | 1039 | 788 |
| Brittleness (°C.) (ASTM D-746) | −35 | −33.5 | −34.5 | −39 |
| Clash-Berg Modulus at −35° C. (psi) (ASTM D-1043) | 46,436 | 45,830 | 39,932 | 36,417 |
| Stiffness Temp (°C.) at 45,000 (psi) | −36.59 | −34.79 | −36.50 | −37.27 |
| Hardness - "A" (ASTM D-240) | 74 | 72 | 68 | 62 |
| Graves Tear | 285 | 250 | 210 | 210 |

TABLE II

| Example No. | Comonomer Type | Level (phm) | Conversion (wt. %) | I.V. | APS (um) | PSD (%) | HG Porosity (ml/g) |
|---|---|---|---|---|---|---|---|
| PVC | — | — | — | 0.945 | 167 | — | 0.231 |
| 8 | VAc | 7.5 | 75 | 0.386(a) | 143 | 40 | 0.034 |
| 9 | VAc | 8.0 | 85 | 0.648(b) | 76 | 49 | 0.097 |
| 10 | TONE M-100 | 5.0 | 75 | 1.22 | 122 | 28 | 0.257 |
| 11 | TONE M-100 | 9.0 | 77 | 1.00 | 158 | 33 | 0.234 |
| 12 | TONE M-100 | 2.5 | 81 | 1.00 | 178 | 27 | 0.241 |
| PVC | — | — | 66 | .668 | 82 | 55 | 0.193 |
| 13 | TONE M-100 | 2.5 | 78 | 0.715 | 92 | 35 | 0.170 |
| 14 | TONE M-100 | 5.0 | 70 | 0.836 | 80 | 52 | 0.221 |
| 15 | TONE M-100 | 9.0 | 78 | 0.818 | 109 | 19 | 0.113 |
| 16 | VS | 2.5 | 75 | 0.537(c) | 120 | 48 | 0.092 |
| 17 | VS | 5.0 | 65 | 0.456(c) | 81 | 51 | 0.093 |
| 18 | VAc | 10.0 | 80 | 0.413(d) | 117 | 204 | 0.024 |

(a) Made at 60° C. with 1.0 phm 2-ME using TBPP/t-amyl peroxyneodecanoate initiator
(b) Made at 55° C. with 0.14 phm 2-ME
(c) Made with 0.10 phm 2-ME
(d) Made with 0.334 phm 2-ME

EXAMPLES 19–23

The suspension polymerization of VCM with various comonomers was carried out following the procedure similar to that set forth in Examples 1–7. A 2-ME CTA molecular weight modifier was optionally employed.

TABLE IV-continued

| Properties | PVC | Example 24 | Example 25 | Example 36 |
|---|---|---|---|---|
| (mg/1000 rev.) (ASTM D-1004) | | | | |
| Oil Resistance (% vol. change) (ASTM D-471) | −22.17 | −23.0 | −22.83 | −22.65 |
| Compression Set (% @ 22 hrs./100° C.) (ASTM D-395) | 74.62 | 76.86 | 79.76 | 81.08 |
| Extrusion Rate | 61 (329° F.) | 60 (325° F.) | 56 (322° F.) | 55 (326° F.) |

EXAMPLES 27–29

Vinyl chloride/acrylated caprolactone (TONE M-100) copolymer resins containing the amount of acrylated caprolactone set forth below were prepared according to Examples 8–12. The resins were compounded and milled into films (7 mills thick) and then evaluated for fish-eye content. The copolymer films were all rated film grade No. 1.

| Example | Comonomer (phm) | Grade No. |
|---|---|---|
| 27 | 2.5 | 1 |
| 28 | 5.0 | 1 |
| 29 | 9.0 | 1 |

EXAMPLE 30

Optical Microscopy (Light Reflectance)

PVC, vinyl chloride/vinyl acetate and vinyl chloride/acrylated caprolactone resins were each mounted to glass microscope slides. Photographs were taken at 44× magnification using reflected light to study the relative light reflectance of each resin. In general, glassy resins permit light to pass through and appear dark because light is not readily reflected. Porous resins, due to their rough internal morphologies, reflect light and therefore appear brighter under the microscope.

The photographs of FIGS. 1a through 1e show that the vinyl chloride/acrylated caprolactone copolymer resins of this invention are similar to PVC homopolymer in light reflectance whereas the prior art copolymers (vinyl chloride/vinyl acetate) are glassy in appearance.

EXAMPLE 31

SEM Microscopy

The surface and internal morphologies of the resins of the present invention were studied via scanning electron mocroscopy. Vinyl chloride/vinyl acetate and vinyl chloride/ethylhexyl acrylate copolymer resins were also studied for comparative purposes. Micrographs were taken at various magnifications to show relative particle sizes, particle shapes, surface textures and internal morphology.

Cross-sectional views were obtained by microtoming resin particles which were previously embedded in a metal alloy. From examination of the cross-sections of the resins, the internal porosity and the size of the primary particles were evaluated as well as the particle shape and size distribution. FIGS. 2a through 2d show the comparative morphologies of the resin particles.

While the present invention has been described in terms of its specific embodiments, certain modifications and equivalents will be apparent to those skilled in the art and are intended to be included within the scope of the present invention, which is to be limited only by the scope of the appended claims.

What is claimed is:

1. A method for improving the porosity of a vinyl halide copolymer resin consisting of suspension copolymerization of a monomer composition consisting of vinyl halide and 1 to 20 phm acrylated caprolactone by weight per 100 phm by weight of vinyl halide, wherein said acrylated caprolactone monomer is represented by the following average formula:

wherein R is hydrogen, lower alkyl or phenyl, $R_1$ and $R_2$ are independently alkylene of 1 to about 8 carbon atoms and n is 1 to 20.

2. The method of claim 1 wherein R is hydrogen, $R_1$ is ethylene, $R_2$ is pentylene and n is 1 to 20.

3. The method of claim 12 wherein said vinyl halide is vinyl chloride, $R_1$ is ethylene, $R_2$ is pentylene and n is 1 to 20.

4. The method of claim 12 wherein said acrylated coprolactone repeating unit is represented by the following average formula:

5. A process for the copolymerization of vinyl halide monomer and acrylated coprolactone monomer in aqueous suspension or microsuspension to prepare copolymers of high porosity said process consisting of copolymerizing the vinyl halide and acrylated caprolactone monomers in aqueous medium in the presence of at least one suspending agent and an adequate amount of at least one polymerization initiator, the polymerization being conducted between 40° C. and 70° C. with or without a chain transer agent, wherein said acrylated caprolactone monomer is represented by the following average formula:

wherein R is hydrogen, lower alkyl or phenyl, $R_1$ and $R_2$ are independently alkylene of 1 to about 8 carbon atoms and n is 1 to 20 and said monomer is present in the amount from about 1 to about 20 phm by weight per 100 phm by weight of vinyl chloride.

6. The process of claim 5 wherein the vinyl halide monomer is present in the amount of about 100 phm by weight and the acrylated caprolactone is present in the amount from about 1 to about 20 phm by weight per 100 phm by weight of vinyl chloride.

7. The process of claim 5 wherein said acrylated caprolactone is metered into the reaction medium during he course of the polymerization reaction.

8. The process of claim 5 wherein said initiator is selected from the group alpha-cumyl peroxyneodecanoate, t-cumyl peroxyneodeconate, t-butyl peroxypivalate and t-amyl peroxyneodecanoate or combinations thereof.

9. The process of claim 16 wherein the polymerization temperature is in the range of 50° to 60° C.

10. The process of claim 16 wherein the vinyl halide is vinyl chloride.

11. The process of claim 16 wherein said vinyl halide is vinyl chloride and said chain transfer agent is a mercaptan, said mercaptan is pre-mixed with an encapsulating amount of an acrylated caprolactone and said acrylated caprolactone being substantially insoluble in water and being miscible with said mercaptan to form an encapsulated mixture and adding said encapsulated mixture to the polymerization medium prior to initiating the polymerization.

12. The method of claim 22, wherein the amount of said mecaptan used is from about 0.05 to about 2 phm by weight based on 100 phm by weight of vinyl chloride.

13. The method of claim 23, wherein said acrylated caprolactone monomer is represented by the following average formula:

wherein R is hydrogen, lower alkyl or phenyl, $R_1$ and $R_2$, are, independently, alkylene of 1 to about 8 carbon atoms and n is 1 to 20.

14. The method of claim 16, wherein $R_1$ is ethylene $R_2$ is pentylene and n is 1 to 20.

15. The method of claim 16, wherein R is hydrogen, $R_1$ is ethylene, $R_2$ is pentylene and n is 1 to 20.

16. The method of claim 22, wherein said chain transfer agent is encapsulated in a non-polymerizing, non-water soluble material.

17. The method of claim 22, wherein said non-polymerizing material is poly(caprolactone).

18. The method of claim 23, wherein said mercaptan chain transfer agent is 2-mercaptoethanol.

19. The method of claim 22, wherein the polymerization temperature is 50° C. to 70° C.

* * * * *